United States Patent
Byoun et al.

(10) Patent No.: US 9,396,751 B1
(45) Date of Patent: Jul. 19, 2016

(54) DATA STORAGE DEVICE COMPENSATING FOR FABRICATION TOLERANCES WHEN MEASURING SPINDLE MOTOR CURRENT

(71) Applicant: Western Digital Technologies, Inc., Irvine, CA (US)

(72) Inventors: Jaesoo Byoun, Irvine, CA (US); Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/752,751

(22) Filed: Jun. 26, 2015

(51) Int. Cl.
G11B 19/20 (2006.01)
G11B 19/247 (2006.01)

(52) U.S. Cl.
CPC ........ G11B 19/2009 (2013.01); G11B 19/2081 (2013.01); G11B 19/247 (2013.01)

(58) Field of Classification Search
None
See application file for complete search history.

(56) References Cited

U.S. PATENT DOCUMENTS

| | | | |
|---|---|---|---|
| 5,631,999 A * | 5/1997 | Dinsmore | G11B 19/00 318/400.17 |
| 5,959,417 A | 9/1999 | Maggio et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |

(Continued)

Primary Examiner — Wayne Young
Assistant Examiner — James L Habermehl

(57) ABSTRACT

A data storage device is disclosed comprising a spindle motor configured to rotate a disk, wherein the spindle motor comprises a stator, a rotor, and a plurality of windings. The data storage device further comprises an isolation circuit configured to isolate the windings from a supply voltage, a head actuated over the disk, and control circuitry comprising a spindle motor driver comprising a plurality of switches including a first switch and a second switch configured to commutate the windings. While driving the isolation circuit with a first calibration current, the first switch is driven with a second calibration current and a first current flowing through the first switch is measured. While driving the isolation circuit with the first calibration current, the second switch is driven with the second calibration current and a second current flowing through the second switch is measured.

34 Claims, 8 Drawing Sheets

(56) References Cited

U.S. PATENT DOCUMENTS

| | | |
|---|---|---|
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,879,128 B2 | 4/2005 | Coutu et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |

(56) References Cited

U.S. PATENT DOCUMENTS

| | | | |
|---|---|---|---|
| 7,502,197 B1 | 3/2009 | Chue | |
| 7,505,223 B1 | 3/2009 | McCornack | |
| 7,542,225 B1 | 6/2009 | Ding et al. | |
| 7,548,392 B1 | 6/2009 | Desai et al. | |
| 7,551,390 B1 | 6/2009 | Wang et al. | |
| 7,557,557 B2 * | 7/2009 | Sugie | G11B 19/28 323/277 |
| 7,558,016 B1 | 7/2009 | Le et al. | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,626,782 B1 | 12/2009 | Yu et al. | |
| 7,630,162 B2 | 12/2009 | Zhao et al. | |
| 7,639,447 B1 | 12/2009 | Yu et al. | |
| 7,656,604 B1 | 2/2010 | Liang et al. | |
| 7,656,607 B1 | 2/2010 | Bennett | |
| 7,659,678 B2 * | 2/2010 | Maiocchi | H02M 3/156 318/400.22 |
| 7,660,067 B1 | 2/2010 | Ji et al. | |
| 7,663,835 B1 | 2/2010 | Yu et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,697,233 B1 | 4/2010 | Bennett et al. | |
| 7,701,661 B1 | 4/2010 | Bennett | |
| 7,710,676 B1 | 5/2010 | Chue | |
| 7,715,138 B1 | 5/2010 | Kupferman | |
| 7,729,079 B1 | 6/2010 | Huber | |
| 7,733,189 B1 | 6/2010 | Bennett | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,760,461 B1 | 7/2010 | Bennett | |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,864,481 B1 | 1/2011 | Kon et al. | |
| 7,864,482 B1 | 1/2011 | Babinski et al. | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,893,638 B2 * | 2/2011 | Akama | H02P 6/06 318/400.01 |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,217,603 B2 * | 7/2012 | Akama | H02P 6/06 318/400.01 |
| 8,228,046 B2 * | 7/2012 | Ingemi | H02J 9/062 323/222 |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,390,367 B1 | 3/2013 | Bennett | |
| 8,432,031 B1 | 4/2013 | Agness et al. | |
| 8,432,629 B1 | 4/2013 | Rigney et al. | |
| 8,432,775 B2 * | 4/2013 | Miyagoe | G11B 5/5582 360/69 |
| 8,451,697 B1 | 5/2013 | Rigney et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,587,238 B2 * | 11/2013 | Maiocchi | H02M 3/156 318/400.3 |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,183 B2 * | 6/2014 | Bonvin | G11B 19/20 318/400.3 |
| 8,749,904 B1 | 6/2014 | Liang et al. | |
| 8,760,796 B1 | 6/2014 | Lou et al. | |
| 8,767,332 B1 | 7/2014 | Chahwan et al. | |
| 8,767,343 B1 | 7/2014 | Helmick et al. | |
| 8,767,354 B1 | 7/2014 | Ferris et al. | |
| 8,773,787 B1 | 7/2014 | Beker | |
| 8,779,574 B1 | 7/2014 | Agness et al. | |
| 8,780,473 B1 | 7/2014 | Zhao et al. | |
| 8,780,477 B1 | 7/2014 | Guo et al. | |
| 8,780,479 B1 | 7/2014 | Helmick et al. | |
| 8,780,489 B1 | 7/2014 | Gayaka et al. | |
| 8,792,202 B1 | 7/2014 | Wan et al. | |
| 8,797,664 B1 | 8/2014 | Guo et al. | |
| 8,804,267 B2 | 8/2014 | Huang et al. | |

(56) References Cited

U.S. PATENT DOCUMENTS

| | | |
|---|---|---|
| 8,824,081 B1 | 9/2014 | Guo et al. |
| 8,824,262 B1 | 9/2014 | Liu et al. |
| 9,013,123 B2 * | 4/2015 | Innes ................. H02P 3/12 318/63 |
| 9,054,607 B2 * | 6/2015 | Otaguro ................. H02P 25/18 |
| 9,093,106 B2 * | 7/2015 | Otaguro ................. G11B 19/28 |
| 9,142,248 B2 * | 9/2015 | Otaguro ................. H02P 6/14 |
| 2008/0265819 A1 | 10/2008 | Chen et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2014/0217943 A1 * | 8/2014 | Bonvin ................. G11B 19/20 318/400.32 |

\* cited by examiner

DATA STORAGE DEVICE COMPENSATING FOR FABRICATION TOLERANCES WHEN MEASURING SPINDLE MOTOR CURRENT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 11 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
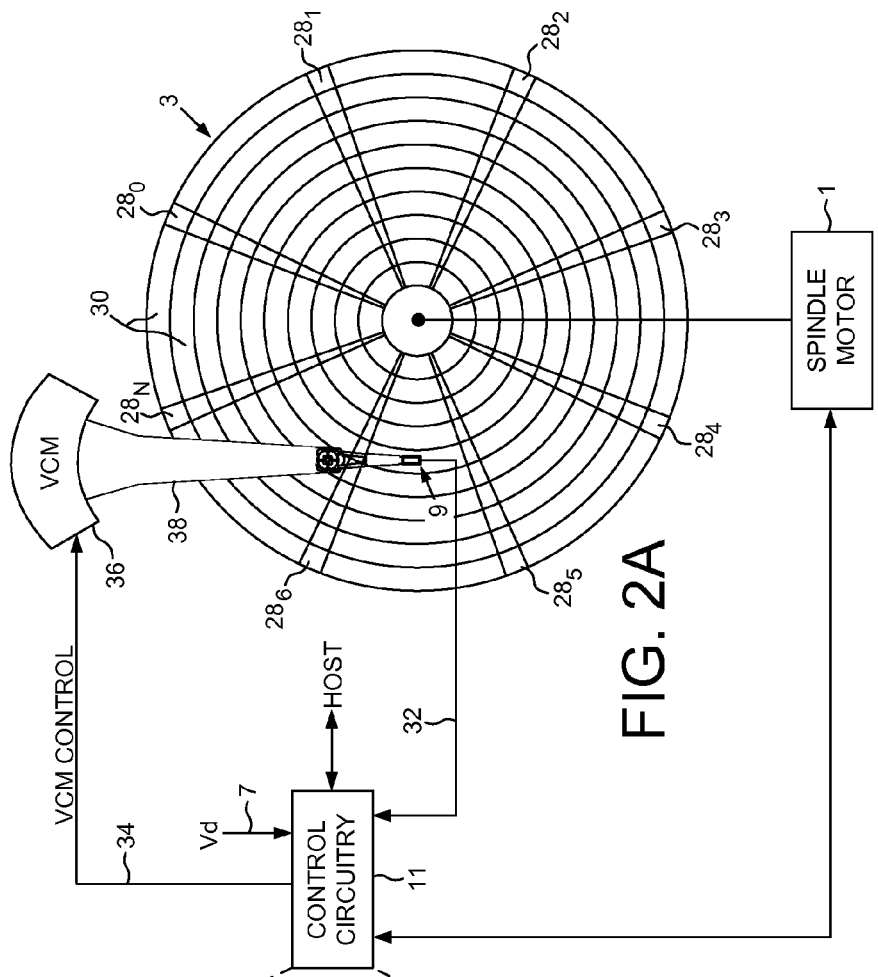
FIG. 2A shows a data storage device in the form of a disk drive according to an embodiment comprising a head actuated over a disk rotated by a spindle motor comprising a plurality of windings.
Figure 2B:
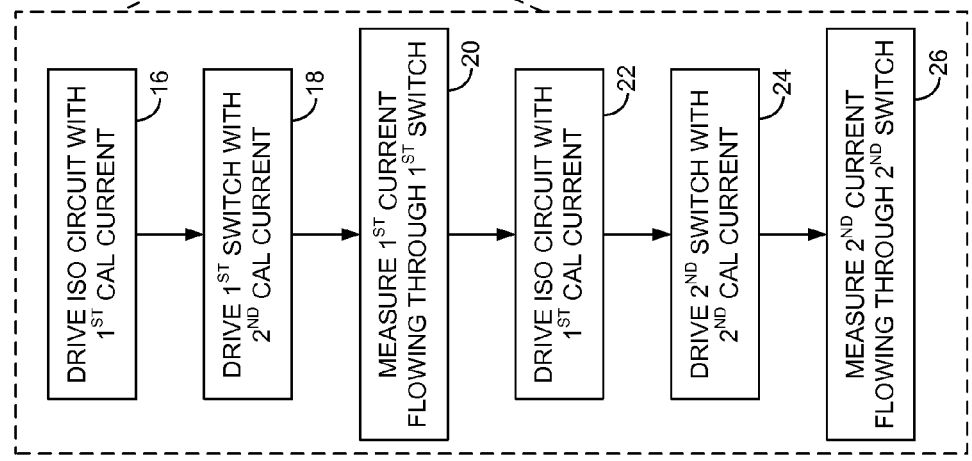
FIG. 2B is a flow diagram according to an embodiment wherein while driving an isolation circuit with a first calibration current, driving the first switch with a second calibration current and measuring a first current flowing through the first switch, and while driving the isolation circuit with the first calibration current, driving the second switch with the second calibration current and measuring a second current flowing through the second switch.
Figure 3:
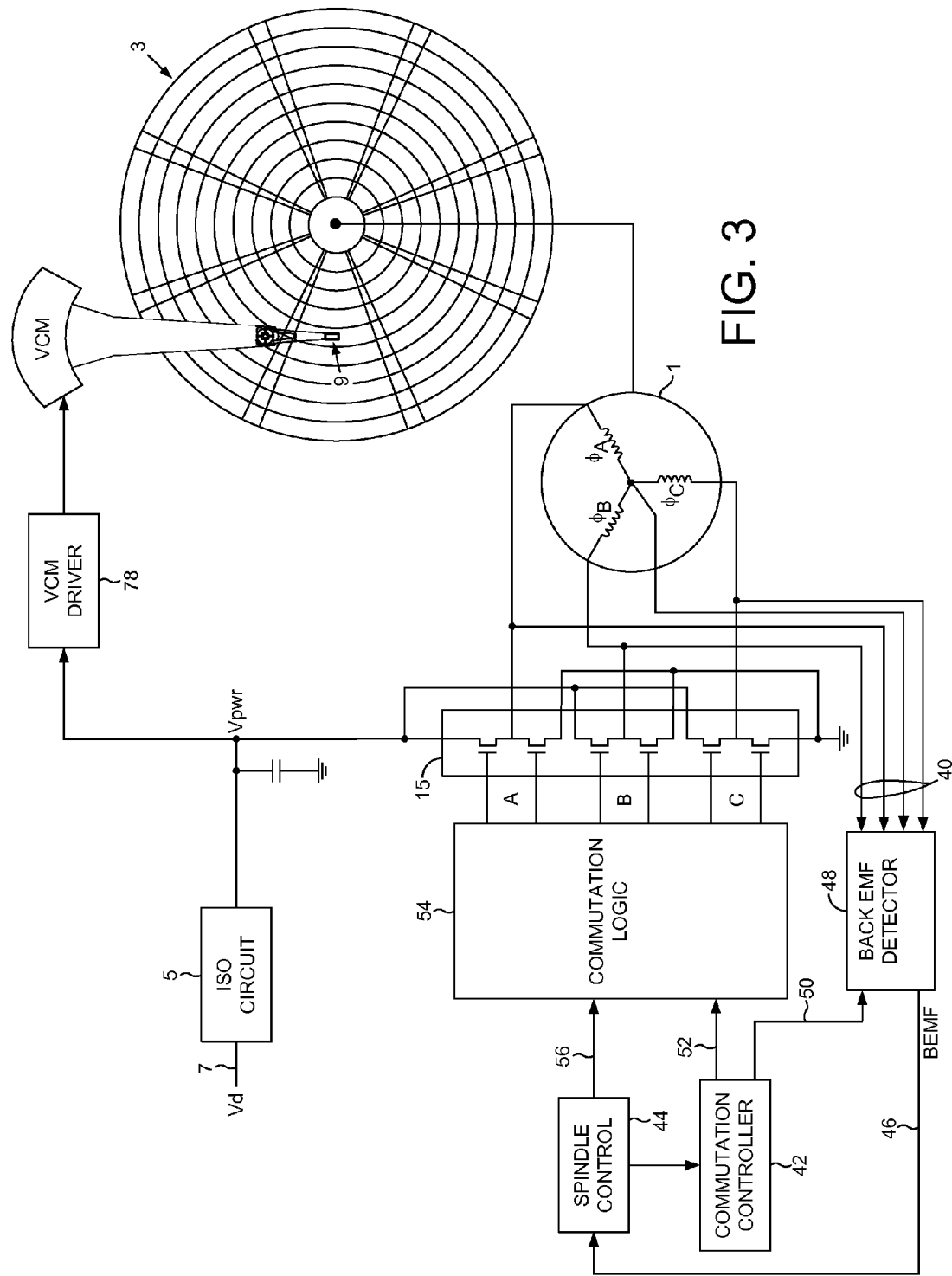
FIG. 3 shows an embodiment wherein control circuitry of the disk drive comprises a spindle motor driver comprising a plurality of switches including a first switch and a second switch configured to commutate the windings of the spindle motor.

FIG. 2A shows a data storage device in the form of a disk drive according to an embodiment comprising a spindle motor 1 configured to rotate a disk 3, wherein the spindle motor 1 comprises a stator, a rotor, and a plurality of windings (FIG. 3). The data storage device further comprises an isolation circuit 5 configured to isolate the windings from a supply voltage 7, a head 9 actuated over the disk 3, and control circuitry 11 comprising a spindle motor driver (FIG. 3) comprising a plurality of switches 15 including a first switch and a second switch configured to commutate the windings. FIG. 2B is a flow diagram according to an embodiment wherein while driving the isolation circuit with a first calibration current (block 16), the first switch is driven with a second calibration current (block 18) and a first current flowing through the first switch is measured (block 20). While driving the isolation circuit with the first calibration current (block 22), the second switch is driven with the second calibration current (block 24) and a second current flowing through the second switch is measured (block 26).

Figure 1:
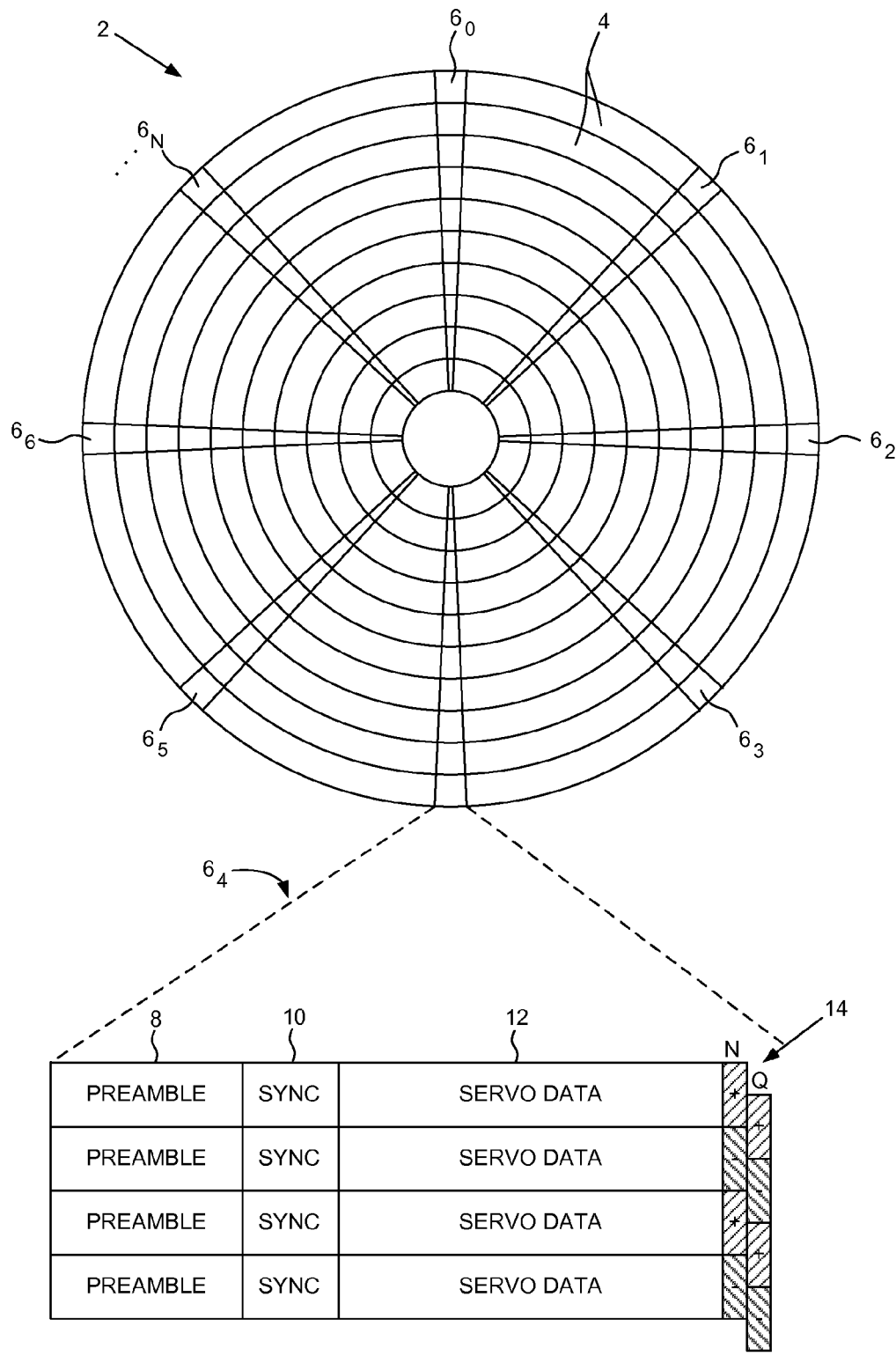
FIG. 1 shows a prior art disk format comprising a plurality of tracks defined by servo sectors.

In the embodiment of FIG. 2A, the disk 3 comprises a plurality of servo sectors $28_0$-$28_N$ that define a plurality of servo tracks 30, wherein data tracks are defined relative to the servo tracks at the same or different radial density. The control circuitry 11 processes a read signal 32 emanating from the head 9 to demodulate the servo sectors $28_0$-$28_N$ and generate a position error signal (PES) representing an error between the actual position of the head and a target position relative to a target track. A servo control system in the control circuitry 11 filters the PES using a suitable compensation filter to generate a control signal 34 applied to a voice coil motor (VCM) 36 which rotates an actuator arm 38 about a pivot in order to actuate the head 9 radially over the disk 3 in a direction that reduces the PES. The servo sectors $28_0$-$28_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

FIG. 3 shows control circuitry 11 according to an embodiment wherein a back electromotive force (BEMF) voltage 40 generated by the windings of the spindle motor 1 may be processed in order to drive the commutation sequence of a commutation controller 42. A spindle control block 44 may process a BEMF signal 46 which may be a square wave representing the BEMF zero-crossings as detected by a BEMF detector 48. The commutation controller 42 may generate a control signal 50 which configures the BEMF detector 48 to detect the zero-crossing of the BEMF voltage generated by each winding as the disk rotates. The commutation controller 42 also generates a control signal 52 applied to commutation logic 54. In the embodiment of FIG. 3, the commutation logic 54 is configured by the control signal 52 to control the state of switches 15 in order to drive the windings with voltage Vpwr. The commutation logic 54 may operate in any suitable manner, such as by driving the switches 15 as linear amplifiers that apply continuous-time sinusoidal voltages to the windings. In another embodiment, the commutation logic 54 may drive the switches 15 using pulse width modulation (PWM), such as using square wave PWM, trapezoidal PWM, or sinusoidal PWM. Regardless as to how the windings are driven, the commutation controller 42 generates the control signal 52 so that the windings are commutated at the correct periods, thereby generating the desired rotating magnetic field that causes the spindle motor to rotate. In one embodiment, the spindle control block 44 may generate a control signal 56 that controls the effective amplitude of the periodic driving voltage applied to the windings (continuous or PWM), thereby controlling the speed of the spindle motor 1.

If a power failure occurs while the disk 3 is spinning, there is residual kinetic energy as the disk 3 continues to rotate the spindle motor 1, and therefore the spindle motor 1 can be converted into a power generator used to power the control circuitry 11 while executing power down operations, such as completing a current write operation to the disk 3 before unloading the head 9 onto a ramp. During the power failure, the isolation circuit 5 isolates the windings of the spindle motor 1 from the supply voltage 7 to prevent current from back flowing into the supply voltage 7. Any suitable isolation circuit 5 may be employed, such as a diode or a field effect transistor (FET) operated as a switch.

In one embodiment, each switch for driving the windings of the spindle motor 1 comprises a suitable current sensor for measuring a current flowing through each switch (and corresponding winding or windings). For example, in one embodiment a current transient response of the windings may be measured in order to estimate a position of the rotor relative to the stator in a technique referred to as inductive sense. In another embodiment, the winding current may be measured in order to optimize the commutation sequence of the commutation controller 42 so as to optimize the torque of the spindle motor 1. Regardless as to why the winding current is measured, in one embodiment a fabrication tolerance of the control circuitry (e.g., the switches 15) may affect the accuracy of the relative current sensing measurements. In addition, the thermal response of the control circuitry may exacerbate the affect of fabrication tolerances on the relative current sensing measurements. For example, when the switches 15 shown in FIG. 3 are fabricated with other control circuitry such as the isolation circuit 5, the heating effect of the isolation circuit 5 during normal operation may affect the accuracy of the relative current sensing measurements. Accordingly in one embodiment, compensation values may be calibrated to compensate for the effect that the fabrication tolerances and thermal response have on the relative current sensing measurements.

Figure 4:
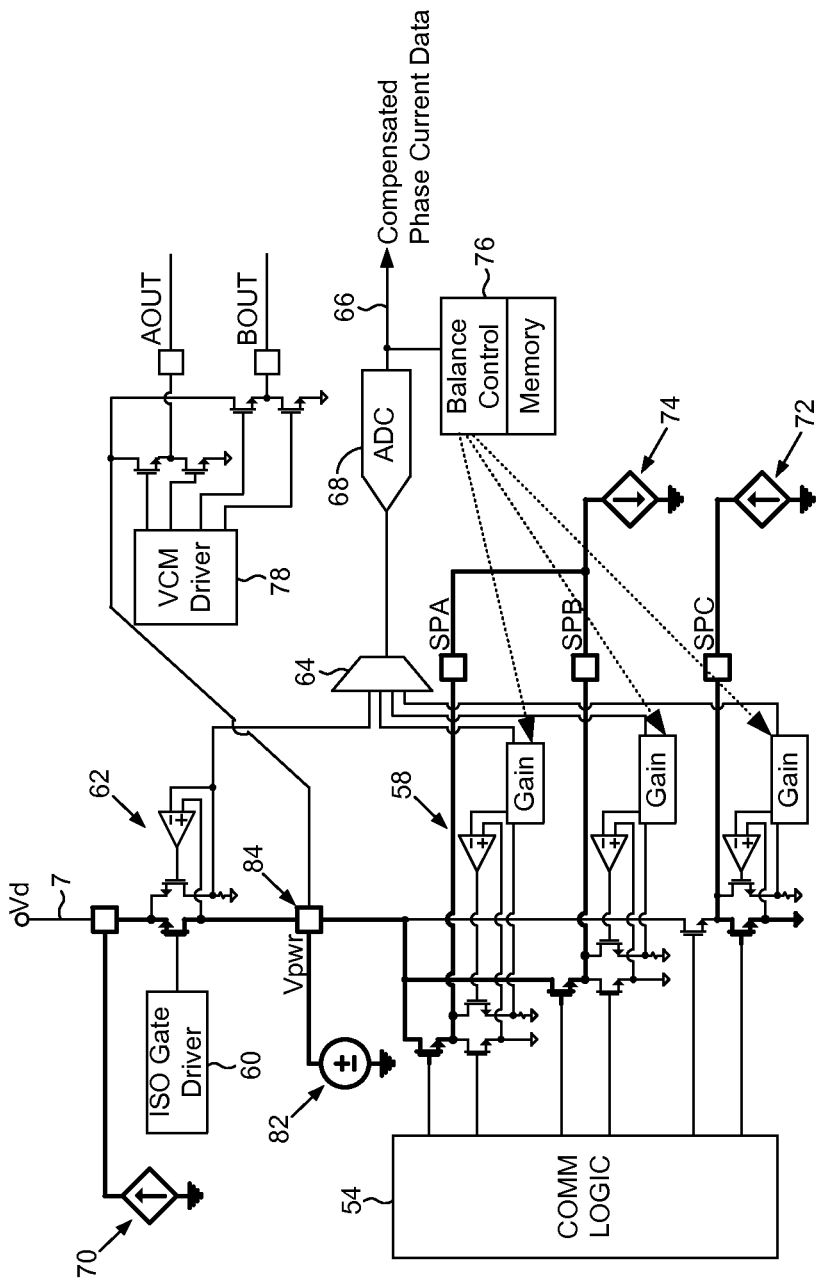
FIG. 4 illustrates an embodiment for generating a compensation value based on the measured first current, wherein the compensation value compensates for a fabrication tolerance including a thermal response.

FIG. 4 shows control circuitry according to an embodiment wherein a select number of the switches 15 shown in FIG. 3 comprises a current sensor (e.g., current sensor 58) comprising a transistor configured as a current mirror and a differential amplifier comprising an adjustable gain and optionally an adjustable offset. For example, in the embodiment of FIG. 4 each low-side switch of each phase may comprise a current sensor implemented as a current mirror. The isolation circuit 5 of FIG. 3 comprises in FIG. 4 a FET controlled by block 60 as well as a current sensor 62 configured to sense the current flowing through the FET. An analog multiplexer 64 is configured to select between the current sensors, wherein the output of the multiplexer 64 is converted into a digital value 66 by an analog-to-digital converter (ADC) 68.

In one embodiment shown in FIG. 4, when calibrating the compensation value for the current sensor of a first one of the switches 15 (e.g., the phase C switch), a first current source 70 drives the FET of the isolation circuit 5 with a first calibration current that corresponds to a normal operating mode of the disk drive, and a second current source 72 drives the phase C switch with a second calibration current. A third current source 74 drives the phase A and phase B switches with a third calibration current that corresponds to the normal operating mode of the disk drive. Driving the FET of the isolation circuit 5 as well as the phase A and phase B switches with a calibration current simulates the heating affect on the phase C current sensor. The multiplexer 64 is configured to select the sensed current flowing through the FET of the isolation circuit 5 which, in one embodiment, becomes a reference current. The multiplexer 64 is then configured to select the sensed current flowing through the phase C switch, and a compensation value is generated (at balance control block 76) to adjust the gain and optionally offset of the current sensor of the phase C switch so that the sensed current of the phase C switch equals a target value relative to the reference current flowing through the isolation circuit 5. The compensation value for the phase C switch is saved in a memory of the balance control block 76 and used to adjust the sensed current of the phase C switch during normal operation of the disk drive (e.g., during inductive sense).

A similar current sense measurement is generated for the phase A switch by driving the phase A switch with the second current source 72 and driving the phase B and phase C switches with the third current source 74. A compensation value is generated relative to the reference current, and the compensation value is saved in the memory of the balance control block 76. A similar current sense measurement is generated for the phase B switch by driving the phase B switch with the second current source 72 and driving the phase A and phase C switches with the third current source 74. A compensation value is generated relative to the reference current, and the compensation value is saved in the memory of the balance control block 76. During normal operation, the compensation values saved in the memory of the balance control block 76 are used to adjust the sensed current for each switch, thereby compensating for the relative difference between the current sense measurements due to a variety of reasons, e.g., the fabrication tolerances and thermal response of the control circuitry. That is, after applying the compensation values the difference between the measured currents flowing through each switch more accurately reflects the actual relative currents of the switches (and the windings) rather than the difference in fabrication tolerances and thermal response of the control circuitry.

The current sources shown in FIG. 4 may be configured to generate any suitable calibration currents when calibrating the compensation values. In one embodiment, the current sensor 62 of the isolation circuit 5 is used as a reference current sensor for calibrating the current sensors of the spindle motor driver. A reference current measurement is generated by configuring the first current source 70 to drive the isolation circuit 5 with a calibration current that corresponds to a normal operating mode of the disk drive. The second and third current sources 72 and 74 are set to zero so that a voltage source 82 sinks the current flowing through the FET of the isolation circuit 5. In one embodiment, the voltage source 82 generates a calibration voltage at node 84 that corresponds to the normal mode of operation for the disk drive. The multiplexer 64 is configured to select the sensed current flowing through the FET of the isolation circuit 5 which becomes the reference current measurement. The second and third current sources 72 and 74 are then configured to generate a calibration current that approximates the calibration current flowing through the FET of the isolation circuit 5 in order to generate the compensation values described above. For example, in one embodiment the second and third current sources 72 and 74 may be configured to the same setting as the first current source 70. In another embodiment, the second and third current sources 72 and 74 may be configured to a setting equal to the first current source 70 minus a quiescent current. That is, in one embodiment the actual current flowing through the FET of the isolation circuit 5 may equal the calibration current generated by the first current source 70 minus a quiescent current. In this embodiment, the gain and optionally the offset of each current sensor of the spindle motor driver are adjusted until the measured current equals the above described reference current measurement. These adjustment values are then saved at the balance control block 76 as the compensation value for each current sensor.

Figure 5:
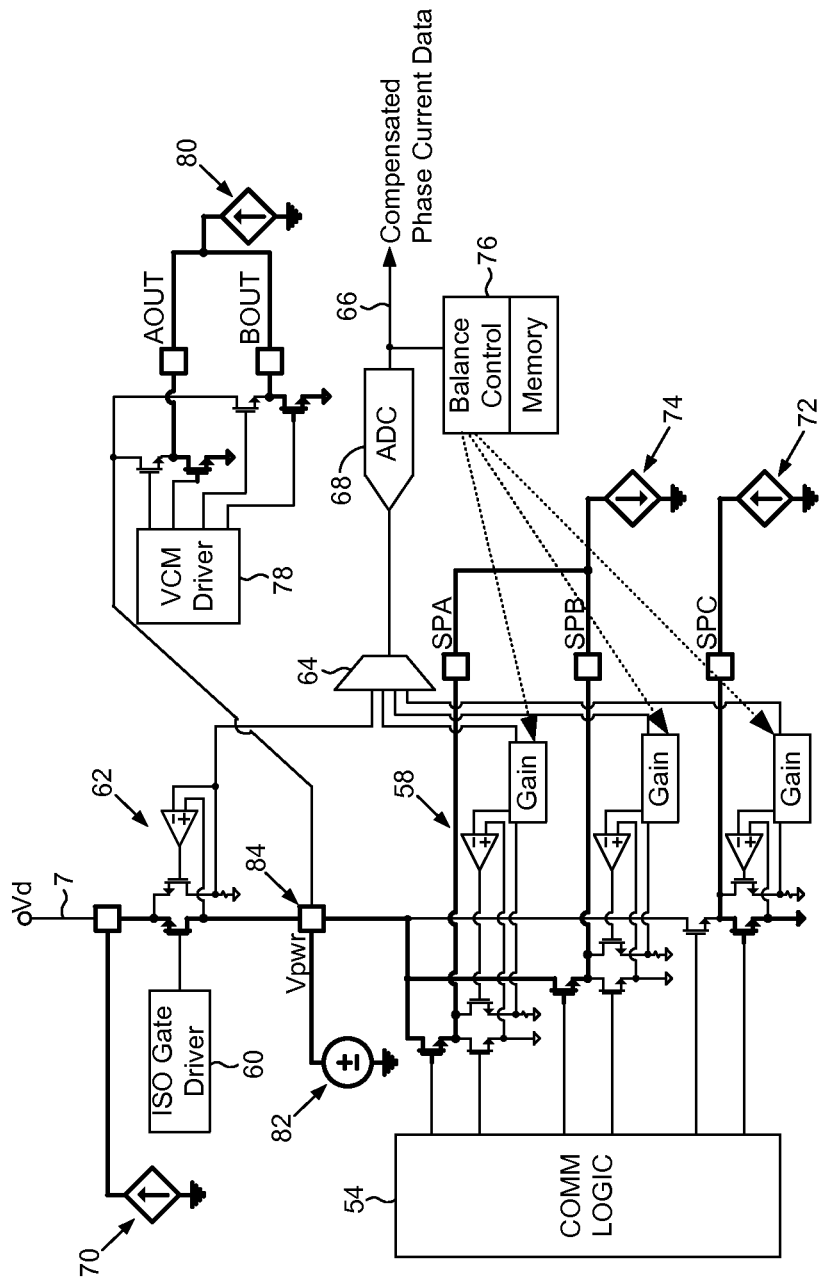
FIG. 5 shows an embodiment wherein the thermal effect of the VCM driver is taken into account when compensating for the thermal response of the first switch.

FIG. 5 shows an embodiment wherein the control circuitry (e.g., integrated circuit) comprises a VCM driver 78 comprising switches (e.g., configured as an H-bridge) that drive current through a voice coil of the VCM 36 (FIG. 2A). In on embodiment, it may be desirable to measure the current flowing through the windings of the spindle motor 1 while the VCM driver is controlling the VCM 36 during a normal operating mode (e.g., during a seek operation to seek the head over the disk or during a tracking operation to track the head over a data track). Accordingly, in this embodiment the thermal effect of the VCM driver 78 when measuring the current flowing through the switches of the spindle motor driver may be taken into account when calibrating the compensation values by driving the VCM driver 78 with a calibration current that corresponds to the normal mode of operation. In this embodiment, a fourth current source 80 generates the calibration current applied to the VCM driver 78 when calibrating the compensation values for the spindle motor current measurements. Also in this embodiment, the calibration current generated by the first current source 70 is increased to simulate the increase in current consumption by the VCM driver 78 (i.e., increased by the setting of the fourth current source 80). When measuring the calibration current flowing though each switch of the spindle motor driver, the voltage source 82 sinks the additional current generated by the first current source 70.

In one embodiment, the calibration currents generated by the current sources in FIG. 4 and FIG. 5 may correspond to different operating modes of the disk drive, and therefore in this embodiment there may be multiple compensation values calibrated for the spindle motor driver current sensors, where each compensation value may correspond to a different operating mode. For example, in one embodiment the disk drive may be in a spin-up mode wherein the spindle motor driver current may be measured when the spindle motor is not yet spinning and/or while the spindle motor is spinning up to speed. The spindle motor driver current may also be measured while the spindle motor is spinning at speed while the VCM 36 is idle (e.g., in a parked position). In yet another embodiment, the spindle motor driver current may be measured while the spindle motor is spinning at speed and while the VCM 36 is being driven during a seek operation or a tracking operation. In yet another embodiment, the spindle motor driver current may be measured at different phases of a seek operation, such as during an acceleration phase, coast phase, and a deceleration phase of the VCM 36. Accordingly, in one embodiment the current sources shown in FIG. 4 and FIG. 5 may be configured to generate calibration currents that simulate the operating mode of the disk drive in order to calibrate a corresponding compensation value for each current sensor of the spindle motor driver. During normal operation, the compensation value that corresponds to the current operating mode may then be used to adjust the measured currents flowing through the switches of the spindle motor driver, thereby compensating for the thermal response of the control circuitry at the different operating modes.

Figure 6A:
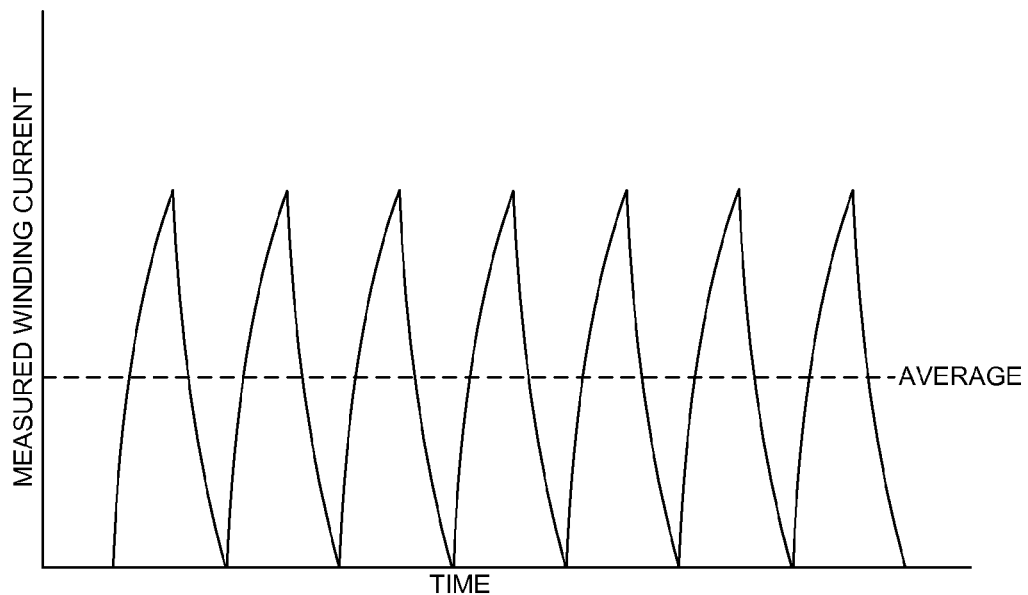
FIG. 6A shows an embodiment wherein a current transient response of at least one of the windings is measured to estimate a position of the rotor relative to the stator and the average of the current transient response is used to calibrate the compensate value.

FIG. 6A illustrates an inductive sense technique for measuring the position of the rotor relative to the stator. In this embodiment, a current transient response of the windings is measured by applying a control voltage and measuring a current response characteristic of the windings. For example, the rise time for the measured current to reach a threshold may depend on the inductance of the windings, wherein the inductance of the windings varies based on the position of the rotor relative to the stator. In one embodiment, the current transient response may be measured for two of the windings connected in series (e.g., phase A and phase B) resulting in six current pulses (plus a dummy pulse) as shown in FIG. 6A wherein each current pulse represents one of the six possible combinations for two out of the three windings. In one embodiment, the calibration current generated by the first and second current sources 72 and 74 shown in FIG. 4 are configured based on the average of the current transient response as shown in FIG. 6A, thereby simulating the heating effect on the current sensor measurements during the inductive sense mode.

Figure 6B:
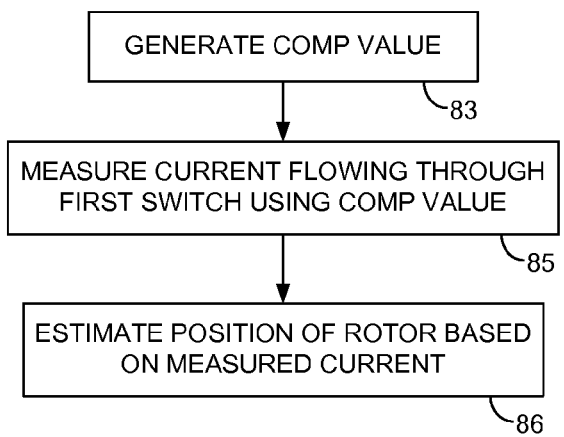
FIG. 6B is a flow diagram according to an embodiment wherein the estimated position of the rotor relative to the stator is estimated based on the measured current transient response of the windings using the calibrated compensation value.

FIG. 6B is a flow diagram according to an embodiment wherein a compensation value for each current sensor of the spindle motor driver is generated as described above (block 83). During the inductive sense mode, a current flowing through a winding (or windings) is measured using the compensation value (block 85). For example, in one embodiment the compensation value is used to adjust the gain and optionally the offset of a corresponding current sensor such as shown in FIG. 4 so that the measured winding current compensates for the fabrication tolerances and thermal response of the control circuitry. The position of the rotor relative to the stator is then estimated based on the measured current (block 86).

Figure 7A:
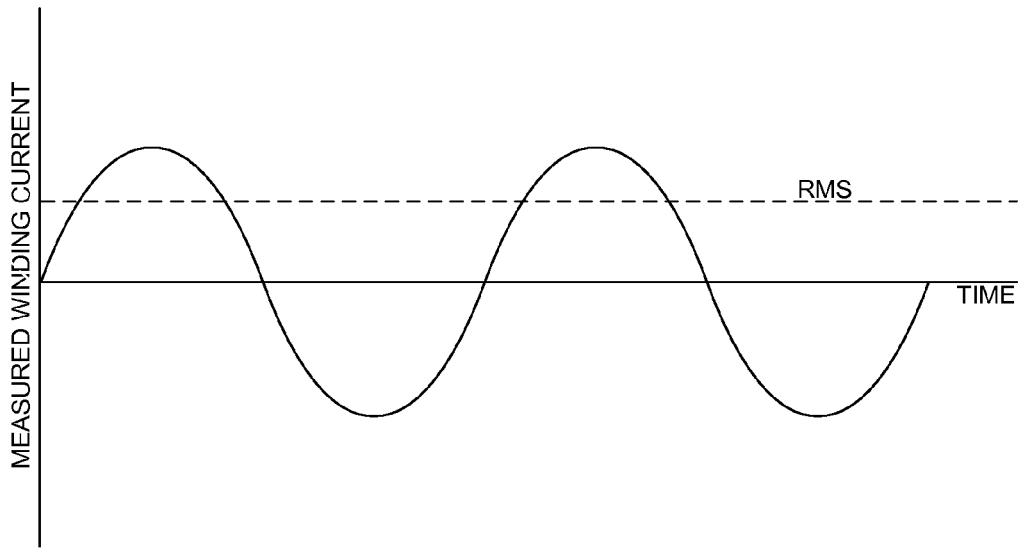
FIG. 7A shows an embodiment wherein the root-mean-square (RMS) of the winding driving current during normal operation is used to calibrate the compensation value.

FIG. 7A shows an embodiment wherein the winding current may be measured in order to optimize the commutation sequence of the commutation controller 42 so as to optimize the torque of the spindle motor 1. In this embodiment, the winding current is measured while the spindle motor is spinning at speed, and therefore the current flowing through the windings is a sinusoidal current as shown in FIG. 7A. In one embodiment, the current sources shown in FIG. 4 are configured to simulate the current flowing through the windings while the spindle motor is spinning at speed by generating the calibration current based on the root-mean-square (RMS) of the sinusoidal winding current shown in FIG. 7A.

Figure 7B:
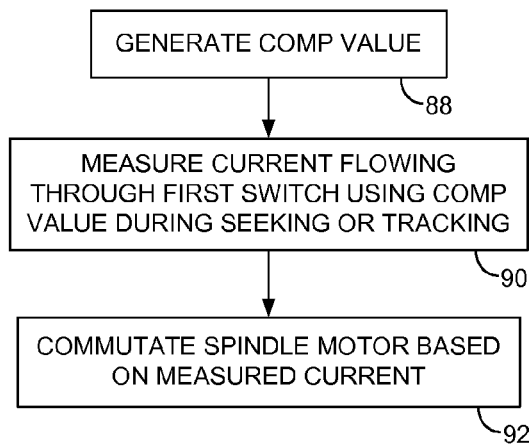
FIG. 7B is a flow diagram according to an embodiment wherein while the spindle motor is spinning at speed the measured current of the windings is adjusted by the calibrated compensation value.

FIG. 7B is a flow diagram according to an embodiment wherein a compensation value for each current sensor of the spindle motor driver is generated as described above (block 88). While the spindle motor is spinning at a normal operating speed, a current flowing through a winding (or windings) is measured using the compensation value (block 90). For example, in one embodiment the compensation value is used to adjust the gain and optionally the offset of a corresponding current sensor such as shown in FIG. 4 so that the measured winding current compensates for the fabrication tolerances and thermal response of the control circuitry. The spindle motor may then be commutated based on the measured current, for example, to optimize the torque generated by the spindle motor (block 92). As described above with reference to FIG. 5, different compensation values may be calibrated corresponding to different operating modes while the spindle motor is spinning at speed, for example, while seeking the head over the disk or tracking the head over a data track.

Figure 8:
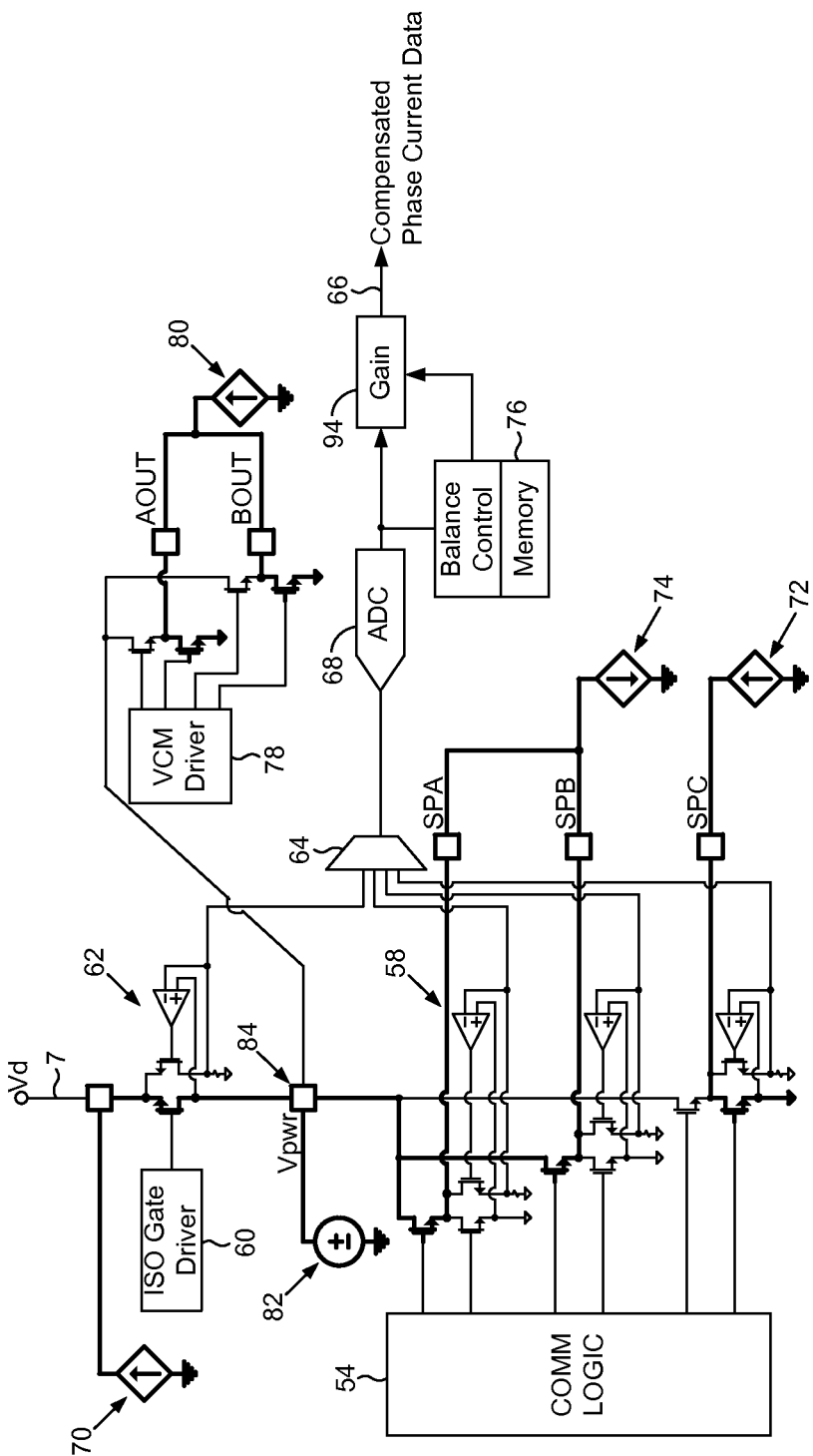
FIG. 8 shows an embodiment wherein the compensation value adjusts the measured current flowing through a switch of the spindle motor driver in the digital domain.

FIG. 8 illustrates an alternative embodiment wherein the compensation values may be used to adjust the winding current measurements in the digital domain by the balance control block 76. That is, the compensation values are used to adjust the digital values generated by the ADC 68 at block 94 in order to adjust the gain and optionally the offset of the measured winding currents to compensate for the fabrication tolerances and thermal response of the control circuitry.

In the embodiments described above, the current sources shown in FIG. 4 and FIG. 5 generate DC calibration currents that simulate the average current consumption during the different operating modes of the disk drive (e.g., inductive sense). In another embodiment, the current sources may be configured to generate AC calibration currents that more accurately simulate the actual current consumption of the disk drive during a normal operating mode. In this embodiment, the control circuitry may calibrate different compensation values each corresponding to the estimated current consumption at any given moment during a particular operating mode, thereby increasing the accuracy of the thermal response compensation when measuring the winding currents during the different operating modes.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a spindle motor configured to rotate the disk, wherein the spindle motor comprises a stator, a rotor, and a plurality of windings;
   an isolation circuit configured to isolate the windings from a supply voltage;
   a head actuated over the disk; and
   control circuitry comprising a spindle motor driver comprising a plurality of switches including a first switch and a second switch configured to commutate the windings, the control circuitry configured to:
      while driving the isolation circuit with a first calibration current, drive the first switch with a second calibration current and measure a first current flowing through the first switch; and
      while driving the isolation circuit with the first calibration current, drive the second switch with the second calibration current and measure a second current flowing through the second switch.

2. The data storage device as recited in claim 1, wherein the control circuitry further comprises a first current source for generating the first calibration current and a second current source for generating the second calibration current.

3. The data storage device as recited in claim 1, wherein the control circuitry is further configured to:
   generate a compensation value based on the measured first current;
   measure a third current flowing through the first switch using the compensation value; and estimate a position of the rotor relative to the stator based on the measured third current.

4. The data storage device as recited in claim 3, wherein the compensation value compensates for a fabrication tolerance.

5. The data storage device as recited in claim 3, wherein the control circuitry is further configured to generate the first calibration current based on a sum of a quiescent current and the second calibration current.

6. The data storage device as recited in claim 1, wherein the control circuitry is further configured to:
  measure a current transient response of at least one of the windings to estimate a position of the rotor relative to the stator; and
  generate the first calibration current and the second calibration current based on an average of the current transient response.

7. The data storage device as recited in claim 1, wherein the control circuitry is further configured to apply a calibration voltage to the isolation circuit when measuring the first current and when measuring the second current.

8. The data storage device as recited in claim 7, wherein the control circuitry comprises a voltage source configured to generate the calibration voltage.

9. The data storage device as recited in claim 8, wherein the voltage source is configured to sink at least part of the first calibration current when measuring the first current and when measuring the second current.

10. The data storage device as recited in claim 1, further comprising a voice coil motor (VCM) configured to actuate the head over the disk and a VCM driver, wherein the control circuitry is further configured to:
  while driving the isolation circuit with the first calibration current and driving the VCM driver with a third calibration current, drive the first switch with the second calibration current and measure a third current flowing through the first switch; and
  while driving the isolation circuit with the first calibration current and driving the VCM driver with the third calibration current, drive the second switch with the second calibration current and measure a fourth current flowing through the second switch.

11. The data storage device as recited in claim 10, wherein the third calibration current corresponds to a driving current applied to the VCM during at least one of a seek operation to seek the head over the disk and a tracking operation to track the head over a data track.

12. The data storage device as recited in claim 10, wherein the control circuitry is further configured to generate the first calibration current based on a sum of the second calibration current and the third calibration current.

13. The data storage device as recited in claim 10, wherein the control circuitry is further configured to:
  generate a compensation value based on the measured third current;
  measure a fifth current flowing through the first switch using the compensation value; and
  estimate a position of the rotate relative to the stator based on the measured fifth current.

14. The data storage device as recited in claim 1, wherein while driving the isolation circuit with the first calibration current and driving the first switch with the second calibration current, the control circuitry is further configured to drive the second switch with a third calibration current while measuring the first current flowing through the first switch.

15. The data storage device as recited in claim 14, wherein the control circuitry comprises a current source for generating the third calibration current.

16. A method of operating a data storage device, the method comprising:
  while driving an isolation circuit with a first calibration current, driving a first switch of a spindle motor driver with a second calibration current and measuring a first current flowing through the first switch; and
  while driving the isolation circuit with the first calibration current, driving a second switch of the spindle motor driver with the second calibration current and measuring a second current flowing through the second switch.

17. The method as recited in claim 16, further comprising generating the first calibration current using a first current source and generating the second calibration current using a second current source.

18. The method as recited in claim 16, further comprising:
  generating a compensation value based on the measured first current;
  measuring a third current flowing through the first switch using the compensation value; and
  estimating a position of a rotor of a spindle motor relative to a stator of the spindle motor based on the measured third current.

19. The method as recited in claim 18, wherein the compensation value compensates for a fabrication tolerance.

20. The method as recited in claim 18, further comprising generating the first calibration current based on a sum of a quiescent current and the second calibration current.

21. The method as recited in claim 16, further comprising:
  measuring a current transient response of at least one of the windings to estimate a position of a rotor of a spindle motor relative to a stator of the spindle motor; and
  generating the first calibration current and the second calibration current based on an average of the current transient response.

22. The method as recited in claim 16, further comprising applying a calibration voltage to the isolation circuit when measuring the first current and when measuring the second current.

23. The method as recited in claim 22, further comprising generating the calibration voltage using a voltage source.

24. The method as recited in claim 23, further comprising the voltage source sinking at least part of the first calibration current when measuring the first current and when measuring the second current.

25. The method as recited in claim 16, further comprising:
  while driving the isolation circuit with the first calibration current and driving a voice coil motor (VCM) driver with a third calibration current, driving the first switch with the second calibration current and measuring a third current flowing through the first switch; and
  while driving the isolation circuit with the first calibration current and driving the VCM driver with the third calibration current, driving the second switch with the second calibration current and measuring a fourth current flowing through the second switch.

26. The method as recited in claim 25, wherein the third calibration current corresponds to a driving current applied to the VCM during at least one of a seek operation to seek a head over a disk and a tracking operation to track the head over a data track.

27. The method as recited in claim 25, further comprising generating the first calibration current based on a sum of the second calibration current and the third calibration current.

28. The method as recited in claim 25, further comprising:
  generating a compensation value based on the measured third current;

measuring a fifth current flowing through the first switch using the compensation value; and estimating a position of a rotate of the spindle motor relative to a stator of the spindle motor based on the measured fifth current.

29. The method as recited in claim 16, wherein while driving the isolation circuit with the first calibration current and driving the first switch with the second calibration current, further comprising driving the second switch with a third calibration current while measuring the first current flowing through the first switch.

30. The method as recited in claim 29, further comprising generating the third calibration current using a current source.

31. Control circuitry of a data storage device, the control circuitry configured to:

while driving an isolation circuit with a first calibration current, drive a first switch of a spindle motor driver with a second calibration current and measure a first current flowing through the first switch; and while driving the isolation circuit with the first calibration current, drive a second switch of the spindle motor driver with the second calibration current and measure a second current flowing through the second switch.

32. The control circuitry as recited in claim 31, wherein the control circuitry further comprises a first current source for generating the first calibration current and a second current source for generating the second calibration current.

33. The control circuitry as recited in claim 31, wherein the control circuitry is further configured to:

generate a compensation value based on the measured first current;

measure a third current flowing through the first switch using the compensation value; and estimate a position of a rotor of a spindle motor relative to a stator of the spindle motor based on the measured third current.

34. The control circuitry as recited in claim 33, wherein the compensation value compensates for a fabrication tolerance.

* * * * *